United States Patent [19]

Moore

[11] Patent Number: 5,932,024
[45] Date of Patent: Aug. 3, 1999

[54] DECOATING TITANIUM AND OTHER METALLIZED GLASS SURFACES

[76] Inventor: Jesse C. Moore, 9125 Thurman St., Wichita, Kans. 67212

[21] Appl. No.: 08/886,864

[22] Filed: Jul. 1, 1997

[51] Int. Cl.$^6$ .............................. C23G 1/02; C09K 13/04
[52] U.S. Cl. .................. 134/3; 134/41; 252/79.2; 252/79.4; 510/245; 510/269; 510/270
[58] Field of Search .................... 252/79.2, 79.3, 252/79.4, 79.5; 134/3, 41; 510/241, 245, 269, 270; 430/5, 323, 321

[56] References Cited

U.S. PATENT DOCUMENTS

| | | | |
|---|---|---|---|
| 3,951,547 | 4/1976 | Fujinami et al. | 355/133 |
| 3,960,560 | 6/1976 | Sato | 96/36 |
| 4,110,114 | 8/1978 | Sato | 96/36 |
| 4,246,328 | 1/1981 | Sato et al. | 430/5 |
| 4,725,375 | 2/1988 | Fujii et al. | 252/79.4 |

*Primary Examiner*—Mark Kopec
*Assistant Examiner*—Gregory E. Webb

[57] ABSTRACT

Glass surfaces having titanium, stainless steel and/or other metals metallized thereon are denuded or reconditioned for a repeat of the initial metallization by contacting the initially metallized surface with an aqueous mixture of one or more strong mineral acids and various of the transition metal salts containing cerium, vanadium, niobium, praseodymium, zirconium, or hafnium, with the optional inclusion of a surfactant to effect removal of the titanium, stainless steel, or whatever metals that are present in or involved in the coating. Oxidation can usually be entirely completed within minutes at modest temperatures of about 20 to about 90 degrees Celsius. The resultants are then water washed, and flushed or scrubbed from the glass surface which can then be processed the same as new glass for repeating metallization with titanium or other metals.

7 Claims, No Drawings

DECOATING TITANIUM AND OTHER METALLIZED GLASS SURFACES

BACKGROUND OF THE INVENTION

FIELD OF THE INVENTION

The present invention relates to new and useful improvements in compositions for and processes for cleaning metal deposits from surfaces, and more particularly pertains to such compositions and processes for removing elemental titanium and other metals from glass surfaces previously metallized therewith.

DESCRIPTION OF RELATED ART

In modern glass production, sheets of glass are often coated with a thin layer of metal to reduce light transmission or increase reflectance. Sheets of glass that have flawed coatings or which are stained during production must now be discarded as there is no safe, cost effective way of removing the stains and the coatings while leaving the glass recoatable.

While no doubt effective in their intended applications, a number of commercially available, industrial grade cleaning compositions generally deemed to be excellent glass cleaners have been tried, but all have been found to be entirely unsuited to meet the objectives desired in this case. Indeed, such failures necessitated our research activities. Representative of compositions tested may be mentioned such as one comprised of hydrocholoric acid, oxalic acid and a surfactant; another, which included benzylsulfonic acid, pumice and surfactant; and another which included concentrated sodium hydroxide, sodium metasilicate and ethyleneglycol butylether. Others tried included one comprised of methylene chloride, 1, 1, 1 trichloroethylene and perchloroethylene; and another which included phosphoric acid and surfactant.

The above tests were conducted both at room as well as at elevated temperatures, and with various of the above compositions in admixture with each other.

Also, extensive inquiries in the industry failed to elicit any information or suggestions on how to realize our objective, namely, to recondition a previously metallized glass surface to accept metallization again; hence the efforts culminating in the present development.

Titanium coatings are particularly stable and intractable, inasmuch as titanium will not dissolve in even hot, concentrated, oxidizing acids. Acids alone, or combination of acids of sulfiric, hydrochloric, oxalic, acetic, phosphoric, nitric, or chromic would not remove coatings except for the more active metals and would not effectively remove stainless steel or titanium. Hydrofluoric acid was not tried because of its extreme toxicity and because it would etch the glass. Again, reviewing the literature and talking with people in the industry turned up no other chemicals or processes that appeared to have any potential for removing the stains and coatings from the glass.

Exemplary of the nearest prior art that was located are the following U.S. Patents:

U.S. Pat. No. 4,424,097, entitled Metal Stripping Processes and Composition, which issued to Lipka et al on Jan. 3, 1984, which discloses for the removal of tin and compounds thereof the use of an aqueous solution of hydrochloric acid, copper, tin and a surfactant.

U.S. Pat. No. 4,555,304, entitled Method of Polishing Glass Articles in an Acid Bath, which issued to Salzle on Nov. 26, 1985, which discloses cleaning a lead glass in an aqueous bath including sulfuric acid, hydrofluoric and oxalic acids.

U.S. Pat. No. 4,588,471 entitled Process for Etching Composite Chrome Layers, which issued to Griffith et al on May 13, 1986, which discloses the use of an aqueous acidic composition inclusive of a thiourea compound in the etching of conductor arrays on glass plates.

SUMMARY OF THE INVENTION

The paramount objective of the invention is to provide a composition for and a process to remove metallic coatings from articles, particularly of relatively inert materials such as glass, in a cost effective fashion that doesn't expose workmen to especially hazardous conditions or entail a significant deleterious environmental impact.

Broadly the invention involves a composition for removing a metallic coating from a base material that is inert to such composition wherein said composition comprises an acid solution of a substance selected from the group consisting of cerium (IV) oxide, vanadium (IV) oxide, niobium (V) oxide, zirconium (IV) oxide, praseodymium (IV) oxide, and hafnium (IV) oxide, and the process of applying such composition to effect removal of the metallic coating.

DESCRIPTION OF THE PREFERRED EMBODIMENT

Glass sheets of flat rectangular configuration, typically ranging in size from about 2 by 2 ft. to about 4 by 8 ft., which either have flawed coatings or constitute a production overrun of no immediate use by reason of tint, size, etc., have the undesired surfaces thereof removed by contacting the same by cleaners of compositions such as hereinafter described.

Such contacting operation can be effected in a variety of ways, the choice of which can usually be based on the convenience of the operator or which procedure is best suited to the equipment at the operator's disposal.

The contacting operation is preferably carried out with the entire coated surface to be treated being free of any obstruction that might interfere with free access to the surface by the treating or cleaning composition. As only one side of the glass is normally coated, this is most easily effected by supporting the glass when disposed horizontally from below with the coated surface uppermost.

The glass is typically disposed above or within a relatively shallow tank. With the tank being at least partially filled with the cleansing composition, the glass can simply be immersed in the solution. Alternatively, with the glass disposed above the liquid level in the tank, the cleaning composition can be sprayed on the upper surface from one or more pressure nozzles, with the liquid collecting in the tank being recycled through a sprayer pump.

An endless conveyer made up of series of glass supporting sections can have its lower flight directed to pass down into an immersion tank during its passage between a glass sheet loading station and a corresponding unloading station. Those conversant with the art will appreciate that the conveyer is caused to travel at a velocity or paused in a manner such that each glass sheet or panel is emersed a sufficient interval of time for the coating to have been fully treated.

Should both sides of the glass panels be coated, it is deemed preferable to immerse the panel twice with first one side being uppermost and then the other. Since the underside is contacted substantially during immersion, the successive immersions can individually be of reduce duration as will be evident.

It is not mandatory that the sheets be treated in a substantially horizontal attitude, as it is possible to dip the sheets edgewise into narrow and sufficiently deep tanks of treating composition. Such serves to treat both sides at once, but the surface areas contacted by supporting equipment must be accorded additional contacting treatment.

Similarly, the glass panels can be supported edgewise vertically or in a reclined attitude in or above a collecting sump, tank or trough, and the treating composition sprayed thereagainst.

Test strips of glass selected from samples metallized with titanium, stainless steel, chromium, copper, zinc, silver, gold, manganese, iron, tin, molybdenum, aluminum, and combinations of these metals layered on the glass were used to test the effectiveness of the cleaning solutions. The cleaning solutions were comprised of acid solutions of the transition metal salts cerium, (IV) oxide, vanadium, (IV) oxide, niobium (V) oxide, zirconium (IV) oxide, praseodymium (IV) oxide, or hafnhium (IV) oxide. The test strips of glass were immersed in the cleaning solution and the time and effectiveness with which the cleaning solution removed the coatings were noted.

The addition of a surfactant, or wetting agent, was found to increase the effectiveness of the cleaning solution, particularly if the glass had been soiled with grease, oil, or fingerprints during handling. Any of a class of surfactants that are acid and oxidation resistant were effective in wetting the surfaces and in making the cleaning solution easier to remove after treatment.

The type of acids used to make the cleaning solutions were nitric, sulfuric, chromic, boric, and phosphoric. The effectiveness of the cleaning solution depended on the concentration of acid in the solution but not strongly on the type of acid used. Any strong acid which does not reduce or precipitate the transition metal ion would be effective, such as any of the class of strong, oxidizing acids.

The cleaning solutions were found to be effective over a temperature range from room temperature up to the temperature at which the solution boiled. The time required to remove the metal coatings varied from days or hours at 25 degrees C. to a few minutes at 95 degrees C., depending on the composition and type of transition metal salt comprising the cleaning solution. Because of the corrosiveness and the fumes from the hot solution, a temperature range of 60 to 90 degrees C. was found to remove the coatings in a reasonable time while minimizing the evolution of fumes, splatterings, or decomposition of the cleaning solution.

The rate at which the glass was decoated was found to depend on the concentration of the transition metal salt comprising the cleaning solution. The solutions were effective over a concentration range of transition metal salt of 0.1% by weight up to the concentration at which the solution became saturated. Over that range, the rate at which the glass was cleaned depended almost directly on the percent of transition metal salt in the cleaning solution. Because of the limited solubility of the transition metal salts, even in acid solutions, concentrations were limited to a maximum of about 10% by weight.

Two of the cleaning solutions were particularly effective as they removed all of the metal coatings tested as well as the usually intractable coatings of stainless steel and titanium from glass. These were comprised of vanadium (IV) salts and cerium (IV) salts and are described in the examples below:

EXAMPLE 1

A solution comprised by the addition of 60.0 grams of vanadium (IV) oxide to a solution of 1.0 liter of 18 Molar sulfuric acid and 21.0 liter of water was used to clean stainless steel coatings from test strips of glass. At a temperature of 90° C., a coating of 350 Angstroms thickness, was removed in ten minutes.

EXAMPLE 2

A cleaning solution was prepared by adding 300 grams of cerium (IV) sulfate to seven liters of water and adding one liter of 18 M sulfuric acid and 10 ml of a surfactant. This composition removed a 350 Angstroms coating of titanium from a 4' by 8' sheet of glass in seven minutes at a temperature of 65 degrees Celsius.

Having now fully described the invention as to its purpose, composition and practice, attention is now directed to the appended claims in order to ascertain the actual scope of the invention.

I claim:

1. A process for removing from a glass surface titanium metal that has been metallized thereon, the step of oxidizing the metallic titanium by contacting the metallized surface with a mixture that includes at least one mineral acid and its ceric salt water and a surfactant for increasing the wettability of the metallized surface.

2. The process of claim 1 which includes the step of freeing the glass surface of resultants and the step of remetallizing the glass surface with titanium.

3. The process of claim 1 where the step of contacting the metallized surface with the mixture is carried out at a temperature between 60 and 90 degrees centigrade.

4. The process of claim 1 where the mineral acid is selected from the group consisting of sulfuric, phosphoric, chromic and nitric.

5. The process of claim 1 where the mixture includes a transition metal oxide as a catalyst.

6. The process of claims where the transition metal oxide catalyst is selected from the group consisting of cerium (IV) oxide, vanadium (IV) oxide, niobium (V) oxide, zirconium (IV) oxide, praseodymium (IV) oxide and hafnium (IV) oxide.

7. The process of claim 8 where the concentration of the transition metal oxide catalyst is between 0.1 percent by weight to 10 percent by weight.

* * * * *